(12) United States Patent
Ogawa et al.

(10) Patent No.: US 11,443,399 B2
(45) Date of Patent: Sep. 13, 2022

(54) IMAGE PROCESSING APPARATUS FOR GENERATING MULTIPLEXED INFORMATION IN WHICH INFORMATION IS EMBEDDED IN AN IMAGE

(71) Applicant: CANON KABUSHIKI KAISHA, Tokyo (JP)

(72) Inventors: Hiroaki Ogawa, Kanagawa (JP); Yoshinori Mizoguchi, Tokyo (JP); Fumitaka Goto, Tokyo (JP); Hiroyuki Sakai, Kanagawa (JP); Hiromitsu Yamaguchi, Kanagawa (JP); Tsukasa Doi, Tokyo (JP); Takeru Sasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/114,285

(22) Filed: Dec. 7, 2020

(65) Prior Publication Data
US 2021/0174468 A1 Jun. 10, 2021

(30) Foreign Application Priority Data
Dec. 9, 2019 (JP) .............................. JP2019-222015

(51) Int. Cl.
*G06T 1/00* (2006.01)
*H04N 1/32* (2006.01)

(52) U.S. Cl.
CPC ....... *G06T 1/0021* (2013.01); *H04N 1/32149* (2013.01); *G06T 2201/0202* (2013.01)

(58) Field of Classification Search
CPC ........... G06T 1/0021; G06T 2201/0202; G06T 2201/0051; G06T 1/0028; H04N 1/32149
See application file for complete search history.

(56) References Cited

U.S. PATENT DOCUMENTS

| | | | | |
|---|---|---|---|---|
| 2004/0091132 A1* | 5/2004 | Eguchi | ................. | G06T 1/0021 382/100 |
| 2020/0126176 A1* | 4/2020 | Lees | ..................... | G06T 1/0028 |

FOREIGN PATENT DOCUMENTS

JP 2003174556 A 6/2003

* cited by examiner

*Primary Examiner* — Christopher Wait
(74) *Attorney, Agent, or Firm* — Canon U.S.A., Inc. IP Division

(57) ABSTRACT

Reduce image quality deterioration of an object area that is gazed viewed by a user in a case where information is embedded in an image. An image processing apparatus including a recognition unit configured to recognize an object within an image and a layout unit configured to lay out information relating to an object recognized by the recognition unit in an area except for an object area for the recognized object within the image.

18 Claims, 14 Drawing Sheets

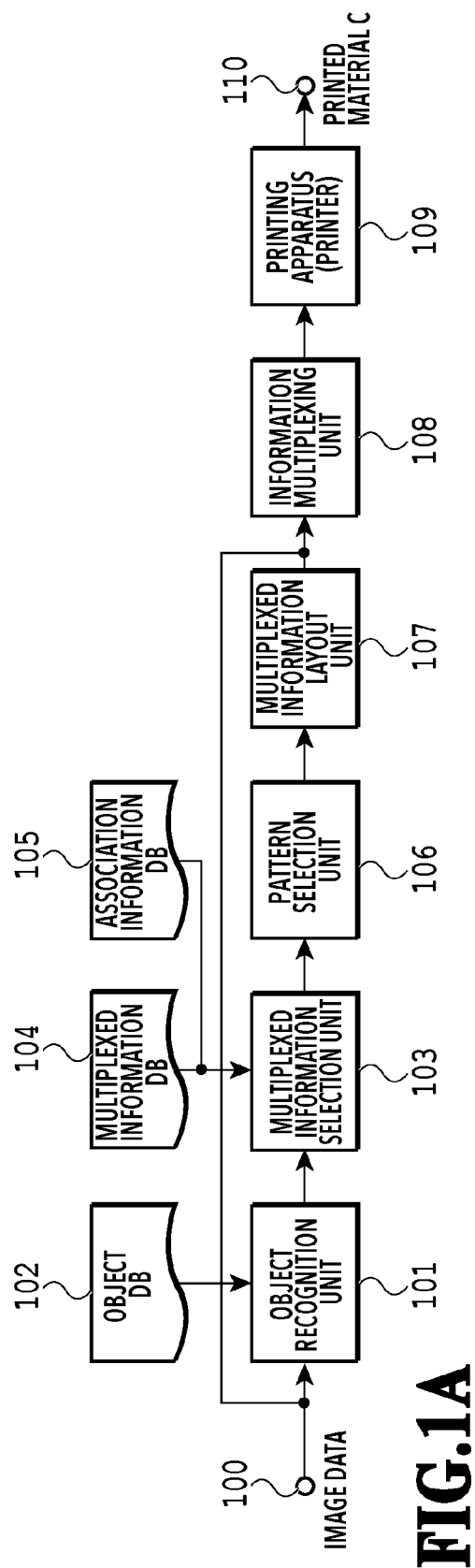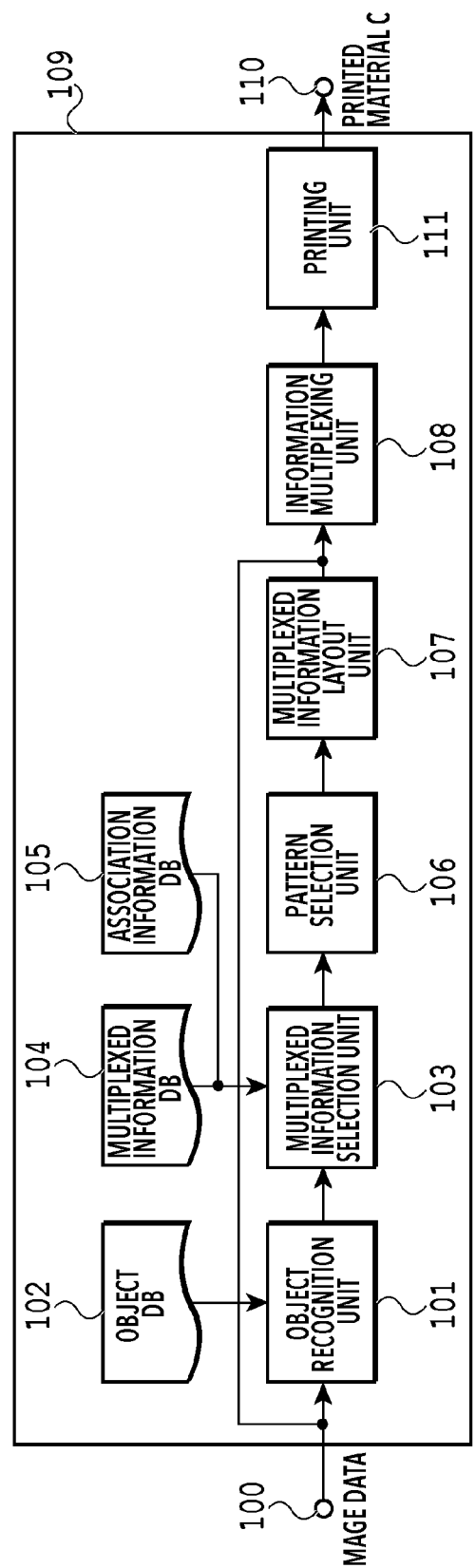

| OBJECT No | FEATURE CLUSTER |
|---|---|
| $I_1$ | $F_1$ |
| $I_2$ | $F_2$ |
| $I_3$ | $F_3$ |

| MULTIPLEXED INFORMATION No | MULTIPLEXED CONTENTS |
|---|---|
| $B_1$ | "hello" |
| $B_2$ | "bye" |
| $B_3$ | "lunch" |

| ASSOCIATION No | MULTIPLEXED INFORMATION No | OBJECT No |
|---|---|---|
| $S_1$ | $B_1$ | $I_3$ |
| $S_2$ | $B_2$ | $I_1$ |
| $S_3$ | $B_3$ | $I_2$ |

|   |   |   |    |    |
|---|---|---|----|----|
| 0 | 0 | 0 | -1 | -1 |
| 0 | -1| -1| 2  | 2  |
| -1| 2 | 2 | -1 | -1 |
| 2 | -1| -1| 0  | 0  |
| -1| 0 | 0 | 0  | 0  |

FIG.4A

|   |   |   |    |    |
|---|---|---|----|----|
| 0 | 0 | -1| 2  | -1 |
| 0 | 0 | -1| 2  | -1 |
| 0 | -1| 2 | -1 | 0  |
| 0 | -1| 2 | -1 | 0  |
| -1| 2 | -1| 0  | 0  |

FIG.4B

| OBJECT No | FEATURE CLUSTER |
|---|---|
| $I_1$ | $F_1$ |
| $I_2$ | $F_2$ |
| $I_3$ | $F_3$ |
| ... | ... |
| $I_N$ | $F_N$ |

FIG.13A

| MULTIPLEXED INFORMATION No | MULTIPLEXED CONTENTS |
|---|---|
| $B_1$ | "hello" |
| $B_2$ | "bye" |
| $B_3$ | "lunch" |
| ... | ... |
| $B_M$ | "pool" |

FIG.13B

| ASSOCIATION No | MULTIPLEXED INFORMATION No | OBJECT No | NUMBER OF OBJECTS | OBJECT SIZE | OBJECT POSITION |
|---|---|---|---|---|---|
| $S_1$ | $B_1$ | $I_3$ | – | – | $Y \geq Y\_TH$ |
| $S_2$ | $B_2$ | $I_1$ | – | $Size \geq SIZE\_TH$ | – |
| $S_3$ | $B_3$ | $I_2$ | – | – | – |
| $S_4$ | $B_4$ | $I_3$ | – | – | $Y < Y\_TH$ |
| $S_5$ | $B_5$ | – | – | $Size \geq SIZE\_TH$ | – |
| $S_6$ | $B_2$ | $I_4$ | – | – | – |
| $S_7$ | $B_6$ | $I_5$ | $Num \geq NUM\_TH$ | – | – |
| $S_8$ | $B_7$ | $I_5$ | $Num < NUM\_TH$ | – | – |
| $S_9$ | $B_8$ | $I_1$ | – | $Size < SIZE\_TH$ | – |

FIG.13C

IMAGE PROCESSING APPARATUS FOR GENERATING MULTIPLEXED INFORMATION IN WHICH INFORMATION IS EMBEDDED IN AN IMAGE

BACKGROUND OF THE INVENTION

Field of the Invention

The present disclosure relates to generation of multiplexed information in which information is embedded in an image.

Description of the Related Art

Conventionally, a technique referred to as an electronic watermark technique is being made use of, which multiplexes additional information in a printed material so that it is difficult to visually recognize the additional information. In the following, overlapping data on another piece of data, which has a meaning different from that of the other piece of data, such as steganography and watermark, or the technical field thereof is generally described as "multiplexing".

In the field of multiplexing, there are applied techniques, such as multiplexing of identification information to prevent illegal forgery of paper money, stamps, securities and the like, embedding of voice information in a photo, and the like. It is possible to provide an additional value to a user by the user reading these pieces of information by, for example, a smartphone.

By the way, the multiplexing technique includes a technique in which a change is made in advance in multiplexing-target data, for example, an image, and embedded multiplexed information is decoded by detecting the change. In the multiplexing such as this, it is necessary to make a change in data in order to embed multiplexed information and in a case where the data in which a change is made is an image, there is a concern that the image quality of the portion in which a change has been made may deteriorate.

Further, an image has an area that is viewed with attention being focused thereon and an image that is not. For example, in a case where a user views an image of a photo in which his/her child is captured, the possibility that the user focuses attention on the portion in the image, in which the child is captured (referred to as object area), is strong and the possibility that the user views the background with attention being focused thereon is less likely. In a case where multiplexed information is embedded in the image such as this, on a condition that the multiplexed information is embedded in the portion in which the child is captured, there is a concern that the image quality of the area in which the child is captured may deteriorate.

Japanese Patent Laid-Open No. 2003-174556 has disclosed that an image is divided into a plurality of areas, a plurality of different periodicities is generated, and a predetermined value is added to the pixel value of the divided area based on the periodicity.

Japanese Patent Laid-Open No. 2003-174556 is a technique to embed multiplexed information in an entire image and has not taken into consideration a reduction in deterioration of an object of interest.

SUMMARY OF THE INVENTION

Consequently, in view of the above-described issue, an object of one embodiment of the present disclosure is to reduce deterioration of image quality of an object area that is viewed by a user in a case where information is embedded in an image.

One embodiment of the present disclosure is an image processing apparatus having: a recognition unit configured to recognize an object within an image; and a layout unit configured to lay out information relating to an object recognized by the recognition unit in an area except for an object area for the recognized object within the image.

Further features of the present disclosure will become apparent from the following description of exemplary embodiments with reference to the attached drawings.

BRIEF DESCRIPTION OF THE DRAWINGS

FIG. 1A and FIG. 1B are each a block diagram showing a configuration of a portion relating to multiplexing encoding of a system in a first embodiment;

FIG. 4A and FIG. 4B are each a diagram showing a mask pattern;

FIG. 13A to FIG. 13C are each a diagram showing a DB in a fourth embodiment.

DESCRIPTION OF THE EMBODIMENTS

Figures 2A, 2B, 2C, 2D:
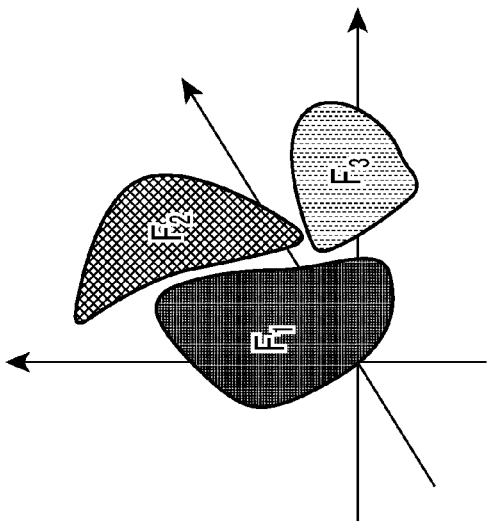
FIG. 2A to FIG. 2D are diagrams for explaining a relationship between a DB relating to object information and multiplexed information and a DB relating to association in the first embodiment.

In the following, with reference to the drawings, preferred embodiments according to the present disclosure are explained in detail. The image processing apparatus in the following explanation is an information multiplexing apparatus that embeds multiplexed information. It is efficient to mount the information multiplexing apparatus such as this as printer driver software or application software within an information processing apparatus (computer) that creates image data to be output to a printer engine. However, the information multiplexing apparatus is not limited to these aspects and it may also be possible to mount the information multiplexing apparatus in a copy machine, a facsimile, a printing apparatus main body and the like as hardware or software.

First Embodiment

In a case where a user views an image, the portion that is gazed at is an object area. Because of this, in a case where information is embedded within the object area and the image quality is deteriorated, the deterioration is conspicuous because the object area is gazed at. Consequently, in the present embodiment, by embedding information in a portion that is not the object area, the degree of conspicuousness of deterioration of image quality is reduced. In the present embodiment, the processing in a case where there is one object within an image is described.

FIG. 1A and FIG. 1B are each a block diagram showing a configuration example of a portion relating to multiplexing encoding of a system that embeds multiplexed information in an image. As shown in FIG. 1A or FIG. 1B, these systems acquire image data and multiplexed information and generates a printed material C in which an image is printed and multiplexed information is embedded.

The system in FIG. 1A is configured so that processing to embed multiplexed information in an image is performed by an image processing apparatus separate from a printing apparatus 109 (for example, printer and the like). In contrast to this, the system in FIG. 1B is configured so that the processing to embed multiplexed information in an image is performed within the printing apparatus 109. In the following, the configuration in FIG. 1A is explained. The configuration in FIG. 1B differs from the configuration in FIG. 1A only in that the embedding processing is performed within the printing apparatus 109, which is performed outside the printing apparatus 109 in the configuration in FIG. 1A, and therefore, detailed explanation of the configuration in FIG. 1B is omitted.

In the configuration in FIG. 1A, image data 100 that is input from an input terminal is, for example, multi-tone image data including color components, specifically, for example, bitmap-format image data that has four channels of cyan, magenta, yellow, and black and in which the pixel value is represented by eight bits. As multiplexed information that is embedded in an image, mention is made of raw data, such as text document data, voice data, and moving image data, compressed data obtained by compressing text document information, voice information, image information, moving image information and the like, and other data converted into binary values. The multiplexed information may be input together with image data or may be stored in advance in a multiplexed information DB. In the following, each of the four colors of cyan, magenta, yellow, and black is represented by one character, such as C, M, Y, and K, and each of the three colors of red, green, and blue is represented by one character, such as R, G, and B.

An object recognition unit 101 performs object recognition processing for image data. As the technique relating to the object recognition, for example, there is a face recognition technique. As a flow of processing of face recognition, first, an area that appears to be a face in the image is specified and a feature quantity of the specified area that appears to be a face is derived. This feature quantity is calculated in accordance with a certain calculation formula and for example, acquisition of a histogram of the specified area, acquisition of amplitude and phase information, which is the results of performing frequency conversion, and the like are also included in the category of the feature quantity calculation. For a plurality of pieces of face information, a feature quantity map is created in advance for each different person. In the field of the face recognition technique, the image data used for creation of the feature quantity map or mapped data is called "training (data)". An object DB 102 is a database for storing the training data. Based on the feature quantity derived for the area that appears to be a face in the image, which person mapped in the feature quantity map, the person within the area resembles is determined. The above is the processing contents of the general face recognition technique.

FIG. 2A shows a database of stored training data in a case where object recognition is performed. That is, FIG. 2A shows an example of the object DB 102. As shown in FIG. 2A, Object No value $I_1$ corresponds to a Feature cluster value $F_1$ and similarly, $I_2$ corresponds to $F_2$ and $I_3$ corresponds to $F_3$.

FIG. 2B is a conceptual diagram of a training data map. In FIG. 2B, the Feature cluster values $F_1$ to $F_3$ are mapped in a three-dimensional map. The object recognition unit 101 derives a feature quantity of an object within an image and based on the derived feature quantity, determines to which of the Feature cluster values $F_1$ to $F_3$ within the three-dimensional map the object corresponds. The cluster described here indicates a range in which it is determined that the object is the relevant object in the map. One point corresponding to a derived feature quantity group is plotted on the basis of the axis of the map and based on whether or not the plotted position is included in the cluster, whether or not the object is the object of the relevant cluster is determined. In a case where it is desired to distinguish information having a complicated feature or in a case where the number of kinds of object desired to be distinguished is large, there is a tendency for the number of axes of the map to increase. Further, it is desirable for the range that a Feature cluster value $F_n$ can take to be a range whose accuracy has been improved by mapping features of objects in the order of several hundred to several thousand for each Feature cluster value.

A multiplexed information selection unit 103 selects optimum multiplexed information from a multiplexed information DB 104 in accordance with the object recognized by the object recognition unit 101. The processing by the multiplexed information selection unit 103 corresponds to processing to select multiplexed information to be embedded in image data.

In multiplexed information, text document data and the like are included. The text document data is, for example, numerical value data in which a figure or a character is allocated to a numerical value by making use of a character code already known publicly. The numerical value data such as this is stored in the multiplexed information DB 104 as multiplexed information.

As a specific example, text document data corresponding to characters of "hello" is explained. It is assumed that the text document data is numerical value data, that is, so-called binary data. The binary data is information represented by "0" and "1" and a continuous combination of "0" and "1" has a specific meaning. The correspondence between binary data and a character is defined by the "character code". In a case of "Shift JIS", which is one of the character codes, "h" corresponds to "01101000" of binary data. Similarly, "e" corresponds to binary data of "01100101", "l" corresponds to that of "01101100", and "o" corresponds to that of "01101111". Consequently, according to the binary data, the characters "hello" can be represented as "0110100001100101011011000110110001101111". Conversely, in a case where it is possible to acquire binary data of "0110100001100101011011000110110001101111", it is possible to acquire the characters "hello" based on the acquired binary data. The multiplexed information DB 104 corresponds to the numerical value data converted into the binary data such as this.

FIG. 2C shows an example of the multiplexed information DB 104. In the table in FIG. 2C, the characters "hello", "bye", and "lunch" desired to be embedded as multiplexed information are stored. These characters correspond to the values (in this example, one of $B_1$ to $B_3$), respectively, of Multiplexed information No for identifying characters.

The multiplexed information selection unit 103 refers to an association information DB 105. In the association information DB 105, information for associating the recognized object and the contents stored in the multiplexed information DB 104 with each other is stored.

FIG. 2D shows a database for storing association information that associates each value of the table in FIG. 2A and each value of the table in FIG. 2C with each other as a specific example of the association information DB 105. In FIG. 2D, a value $S_1$ of Association No, which is association information, is associated with the correspondence between $B_1$ and $I_3$, $S_2$ is associated with the correspondence between $B_2$ and $I_1$, and $S_3$ is associated with the correspondence between $B_3$ and $I_2$. It is possible for the multiplexed information selection unit 103 to select multiplexed information optimum for the object in the image by referring to the multiplexed information DB 104 by using the association information. In the following, selecting multiplexed information (referred to information selection processing) optimum for the object in the image, which is performed by the multiplexed information selection unit 103, is explained by using FIG. 3.

Figure 3:
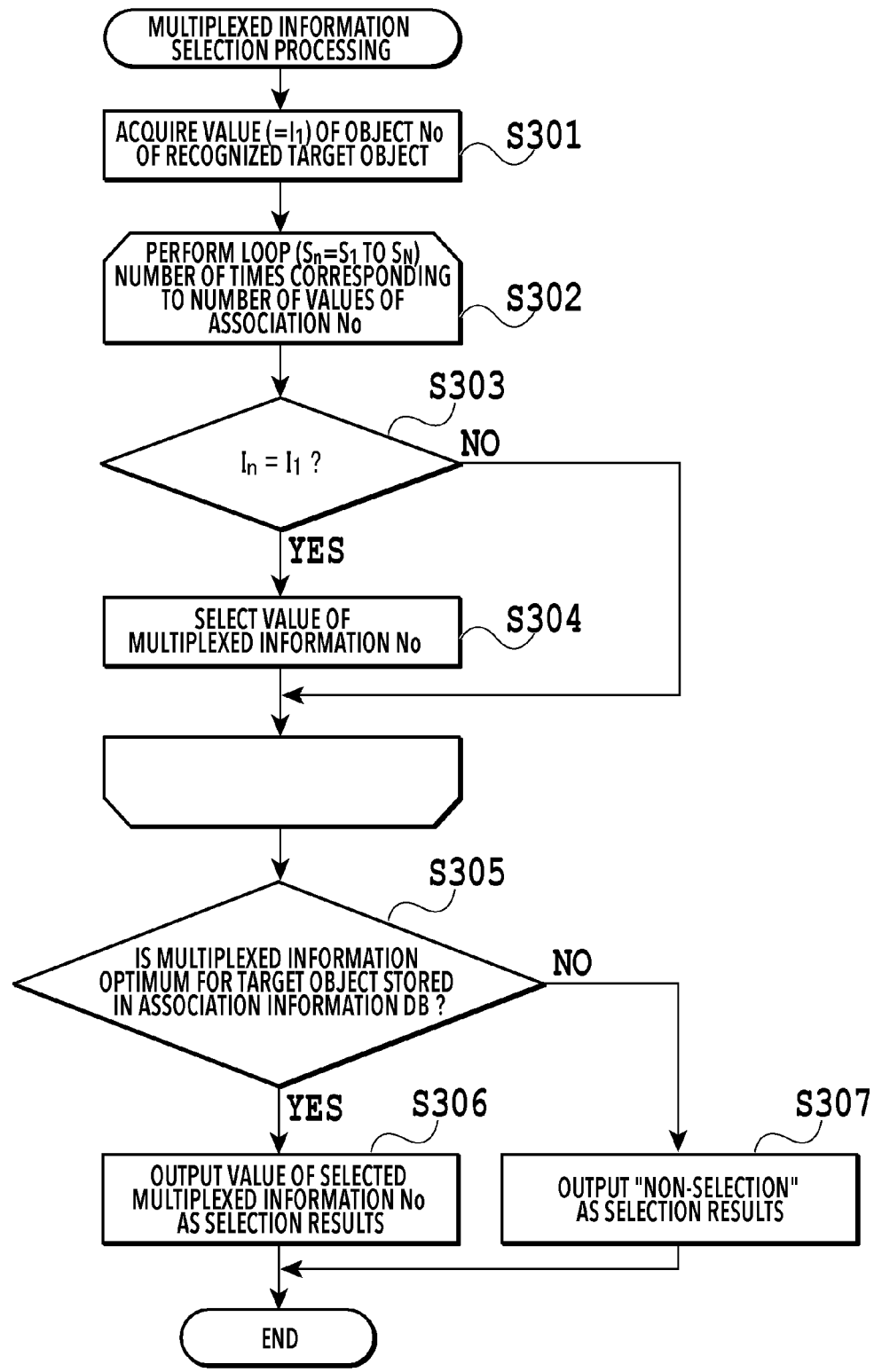
FIG. 3 is a flowchart of information selection processing in the first embodiment.

FIG. 3 is a flowchart of information selection processing in the present embodiment and shows a procedure to select multiplexed information for the object recognized by the object recognition unit 101 for each step. In the following, explanation is given by taking a case as a specific example where the value of Object No for the recognized object is $I_1$. In a case where a plurality of objects is recognized in the image, the processing of the same flow is performed for each of the plurality of recognized objects. Each step in FIG. 3 is performed by the CPU of the image processing apparatus (in a case of FIG. 1A) or the CPU of the printing apparatus 109 (in a case of FIG. 1B).

At S301, the multiplexed information selection unit 103 acquires the value of Object No corresponding to the target object recognized by the object recognition unit 101. In FIG. 2A, as the values of Object No, $I_1$ to $I_3$ exist, but in the following, explanation is given by supposing a case where the value of Object No corresponding to the target object is $I_1$. That is, the object recognition unit 101 outputs the feature quantity "$F_1$" extracted from the object within the image to the multiplexed information selection unit 103. Then, the multiplexed information selection unit 103 acquires "$I_1$" as the value of Object No based on the feature quantity "$F_1$" and the object DB 102. In the following, "step S-" is abbreviated to "S-".

At S302, the multiplexed information selection unit 103 performs loop processing at S303 to S304 the number of times at the maximum, which corresponds to the number of values of Association No (assumed to be N) stored in the association information DB 105 (for example, FIG. 2D). For example, in a case where the table in FIG. 2D is used, as the values of Association No, $S_1$ to $S_3$ are stored, and therefore, the repeated processing is performed three times at the maximum. The loop processing at S303 to S304 is terminated at the point in time at which the value of Multiplexed information No corresponding to the value of Object No acquired at S301 is found and the processing advances to S305.

At S303, the multiplexed information selection unit 103 determines whether the value of Object No that coincides with the value (in this example, $I_1$) of Object No acquired at S301 is stored in the row of Association No of interest by referring to the association information DB 105 (for example, FIG. 2D). In a case where the determination results at this step are affirmative, the processing advances to S304 and on the other hand, in a case where the determination results are negative, the processing advances to the next loop processing (S303 to S304).

At S304, the multiplexed information selection unit 103 selects the value of Multiplexed information No associated with the value of Object No of the recognized target object by referring to the association information DB 105 (for example, FIG. 2D). Specifically, the multiplexed information selection unit 103 selectively determines the value of Multiplexed information No associated with the value of Object No acquired at S301 as the value of Multiplexed information No for identifying the contents of the information to be attached to the target object. In a case where the value of Object No acquired at S301 is $I_1$ and the table in FIG. 2D is used, at this step, $B_2$ is selected as the value of Multiplexed information No.

At S305, the multiplexed information selection unit 103 determines whether the multiplexed information optimum for the target object recognized by the object recognition unit 101 is stored in the association information DB 105. In a case where the determination results at this step are affirmative, the processing advances to S306 and on the other hand, in a case where the determination results are negative, the processing advances to S307. In the specific example of the present embodiment, as the value of Multiplexed information No, $B_2$ is selected at S304, and therefore, the determination results at S305 are affirmative.

At S306, the multiplexed information selection unit 103 outputs the value (in the present embodiment, "$B_2$") of Multiplexed information No selected at S304 and the CPU of the image processing apparatus acquires the output value.

At S307, the multiplexed information selection unit 103 outputs a value indicating that multiplexed information is not selected (value indicating "non-selection") because the multiplexed information optimum for the target object is not stored in the association information DB 105. Then, the CPU of the image processing apparatus acquires the output value. The above is the contents of the information selection processing. By performing the processing of the flowchart in FIG. 3, the multiplexed information corresponding to the kind of recognized object (Object No) is selected automatically, and therefore, the operability improves.

A pattern selection unit 106 selects a mask pattern to be applied to the digitized multiplexed information received from the multiplexed information selection unit 103 from among the mask patterns for performing density modulation of each pixel for each block. The mask pattern that is selected at this step is stored in advance in the storage device of the image processing apparatus.

FIG. 4A and FIG. 4B each show a mask pattern corresponding to binary data and the mask pattern in FIG. 4A corresponds to "0" and the mask pattern in FIG. 4B corresponds to "1". These mask patterns have a size corresponding to an area of 5 px×5 px. By combining (applying) a pattern having a different periodicity as in FIG. 4A or FIG. 4B with (to) the image data corresponding to the area of 5 px×5 px, the binary data of "0" or "1" is embedded. Conversely, in a case where a printed image is read, it is possible to read the binary data of "0" and "1" by recognizing the periodicity corresponding to the binary data of "0" and "1" by the frequency analysis for the acquired data, or the like. The pattern selection may not be performed by the pattern selection unit 106 and may be performed by an information multiplexing unit 108, to be described later.

A multiplexed information layout unit 107 performs processing (referred to as multiplexed information layout processing) to determine at which position in the image the multiplexed information selected by the multiplexed information selection unit 103 is laid out. In the following, the multiplexed information layout processing is explained by using FIG. 5.

Figure 5:
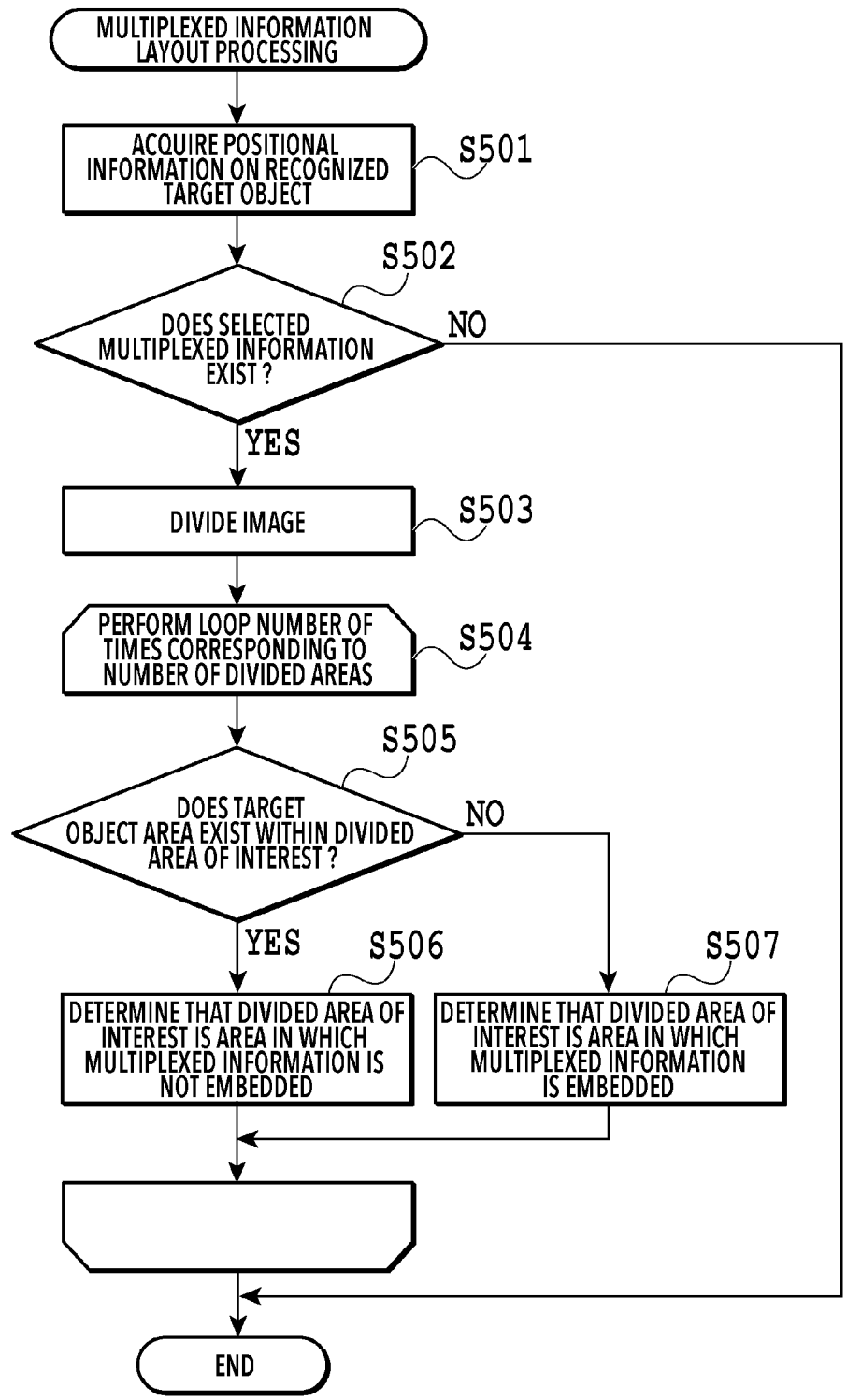
FIG. 5 is a flowchart of multiplexed information layout processing in the first embodiment.

FIG. 5 is a flowchart of the multiplexed information layout processing and shows a procedure to determine the position at which the multiplexed information selected by the multiplexed information selection unit 103 is embedded in the image for each step. Each step in FIG. 5 is performed by the CPU of the image processing apparatus (in a case of FIG. 1A) or the CPU of the printing apparatus 109 (in a case of FIG. 1B).

At S501, the multiplexed information layout unit 107 acquires the positional information on the target object recognized by the object recognition unit 101. The positional information that is acquired at this step may be the positional information acquired at the time of the object recognition unit 101 performing area specification, or it may also be possible to find the positional information on a specified area by the multiplexed information layout unit 107 specifying anew the area in which the object exists.

At S502, the multiplexed information layout unit 107 determines whether the multiplexed information selected for the target object exists. For example, at S502, the multiplexed information layout unit 107 performs determination processing based on the information acquired from the multiplexed information selection unit 103. Specifically, the object recognition unit 101 outputs the feature quantity "$F_1$" extracted from the target object to the multiplexed information selection unit 103. Then, the multiplexed information selection unit 103 acquires "$I_1$" as the value of Object No based on the feature quantity "$F_1$" and the object DB 102. Further, the multiplexed information selection unit 103 outputs the Multiplexed information No value "$B_2$" specified based on the value "$I_1$" of Object No and the association information DB 105 to the multiplexed information layout unit 107. Here, the multiplexed information layout unit 107 determines that the results of the determination are affirmative at S502 in a case where it is possible to acquire Multiplexed information No. On the other hand, in a case where it is not possible to acquire Multiplexed information No, the multiplexed information layout unit 107 determines that the results of the determination are negative at S502. In a case where the determination results at this step are affirmative, the processing advances to S503 and on the other hand, in a case where the determination results are negative, the multiplexed information layout processing is terminated.

Figure 6A:
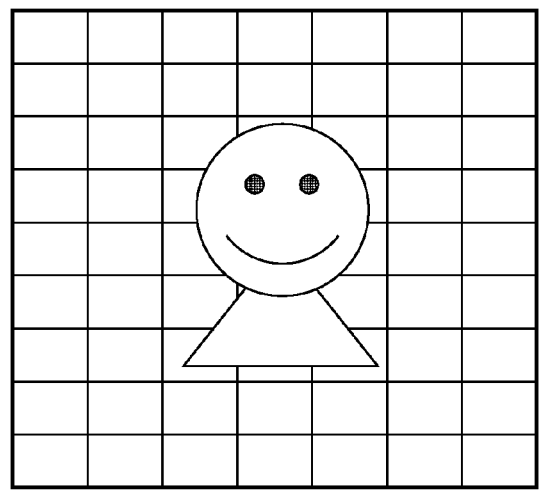
FIG. 6A and FIG. 6B are diagrams for explaining the multiplexed information layout processing in the first embodiment.

At S503, the multiplexed information layout unit 107 divides an image. FIG. 6A shows a divided image. The size of one small area after the division (referred to as divided area) is (number of bits of binary data of information desired to be embedded)×(size of mask pattern necessary to represent one bit of binary data). For example, in a case where characters of "hello" are represented by binary data, as explained above, the number of bits of binary data is 40, that is, "0110100001100101011011000110110001101111". The size of the mask pattern necessary to represent one bit of binary data is 5 px×5 px as described previously. Consequently, in a case where an attempt is made to embed the characters of "hello", the area whose size is 40×5×5=1,000 px is necessary. The shape of the divided area may be square or rectangular. After determining the size and shape of the divided area, the multiplexed information layout unit 107 divides the image so that the divided area has the size and shape.

At S504, the multiplexed information layout unit 107 performs loop processing at S505 to S507 the number of times corresponding to the number of divided areas.

At S505, the multiplexed information layout unit 107 determines whether the target object area exists within the divided area on which attention is focused (referred to as divided area of interest) by using the positional information on the target object acquired at S501. The multiplexed information layout unit 107 determines that the target object area exists in the divided area of interest not only in a case where the target object area exists across the divided area of interest but also in a case where the target object area exists in a part of the divided area of interest. In a case where the determination results at this step are affirmative, the processing advances to S506 and on the other hand, in a case where the determination results are negative, the processing advances to S507.

Figure 6B:
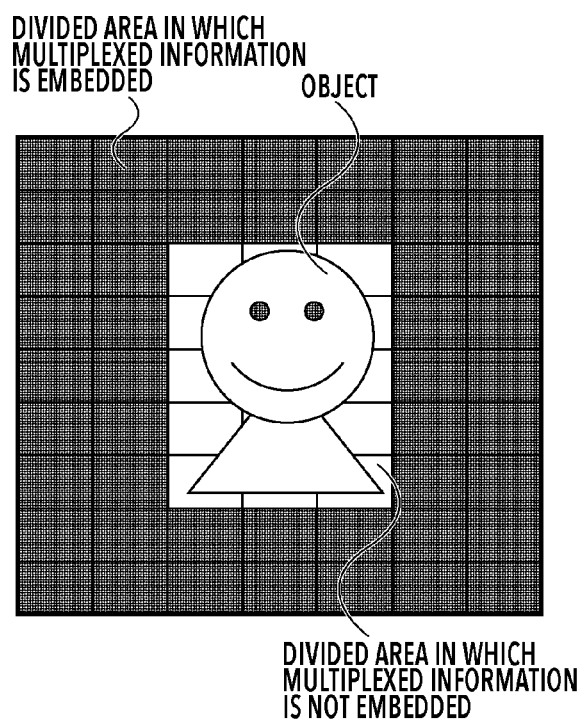

At S506, the multiplexed information layout unit 107 determines that the divided area of interest is an area in which multiplexed information is not embedded. FIG. 6B is a diagram showing the divided areas in which multiplexed information is embedded and the divided areas in which multiplexed information is not embedded. The portion indicated as the divided areas in which multiplexed information is not embedded in FIG. 6B is the areas determined to be the areas in which multiplexed information is not embedded at S506. In the present embodiment, it is desired to embed multiplexed information while avoiding the object area, and therefore, the divided areas in which the object area exists are determined to be the areas in which multiplexed information is not embedded at this step.

At S507, the multiplexed information layout unit 107 determines that the divided area of interest is the area in which multiplexed information is embedded. The portion indicated as the divided areas in which multiplexed information is embedded in FIG. 6B is the areas determined to be the areas in which multiplexed information is embedded at S507. In the present embodiment, it is desired to embed multiplexed information while avoiding the object area, and therefore, the divided areas in which the object area does not exist are determined to be the areas in which multiplexed information is embedded at this step. The above is the contents of the multiplexed information layout processing. By the processing in FIG. 5, it is possible to reduce the image quality deterioration of the object area that is gazed at by a user.

The information multiplexing unit 108 acquires the image data 100, the mask pattern selected by the pattern selection unit 106, and the layout information set by the multiplexed information layout unit 107. This layout information is positional information indicating in which divided area in the image multiplexed information is embedded. After acquiring these pieces of information, the information multiplexing unit 108 generates image data in which the mask pattern is applied to the specified area of the image represented by the image data 100 based on the acquired information.

For example, a case is studied where the image data is taken to be the U color plane of YUV, the U color plane is processed for each block (5 px×5 px) belonging to the inside of the specified area, and the value of the mask pattern in FIG. 4A or FIG. 4B is applied to the value of the U color plane of YUV. Here, as an example, as in formula (1), it is assumed that addition/subtraction processing is performed for the value (referred to as U value) of the U color plane of YUV in accordance with the numerical value of these mask patterns and the reference value on the basis of which the addition/subtraction processing is performed is taken to be 10.

[Mathematical formula 1]

$$U \text{ value after application} = U \text{ value of } YUV + \text{reference value numerical value of mask pattern} \quad \text{formula (1)}$$

For example, in a case where the U value of one pixel within one block is "20" and the numerical value of the mask pattern to be applied is "0", the U value is processed as in formula (2)

[Mathematical formula 2]

$$U \text{ value after application} = 20 + 10 \times 0 = 20 \quad \text{formula (2)}$$

Further, for example, in a case where the U value of one pixel within one block is "30" and the numerical value of the mask pattern to be applied is "2", the U value is processed as in formula (3).

[Mathematical formula 3]

$$U \text{ value after application} = 30 + 10 \times 2 = 50 \quad \text{formula (3)}$$

Furthermore, for example, in a case where the U value of one pixel within one block is "40" and the numerical value of the mask pattern to be applied is "−1", the U value is processed as in formula (4).

[Mathematical formula 4]

$$U \text{ value after application} = 40 + 10 \times (-1) = 30 \quad \text{formula (4)}$$

As above, in the present embodiment, multiplexing is implemented by adding the value obtained by multiplying the numerical value of the mask pattern to be applied and the reference value for each pixel. As the application method of a mask pattern, it may be possible to adopt any method as long as it is possible to embed a mask pattern on the U color plane by the method, and the method is not limited to the method described here.

The processing that is performed by the object recognition unit 101 and the processing that is performed by the information multiplexing unit 108, both described previously, may be performed outside the printing apparatus 109 (see FIG. 1A) or may be performed inside the printing apparatus 109 (see FIG. 1B). The image data after the multiplexing encoding processing, which is output by the information multiplexing unit 108, is transmitted to the printing apparatus 109 or the printing unit 111.

Figure 7:
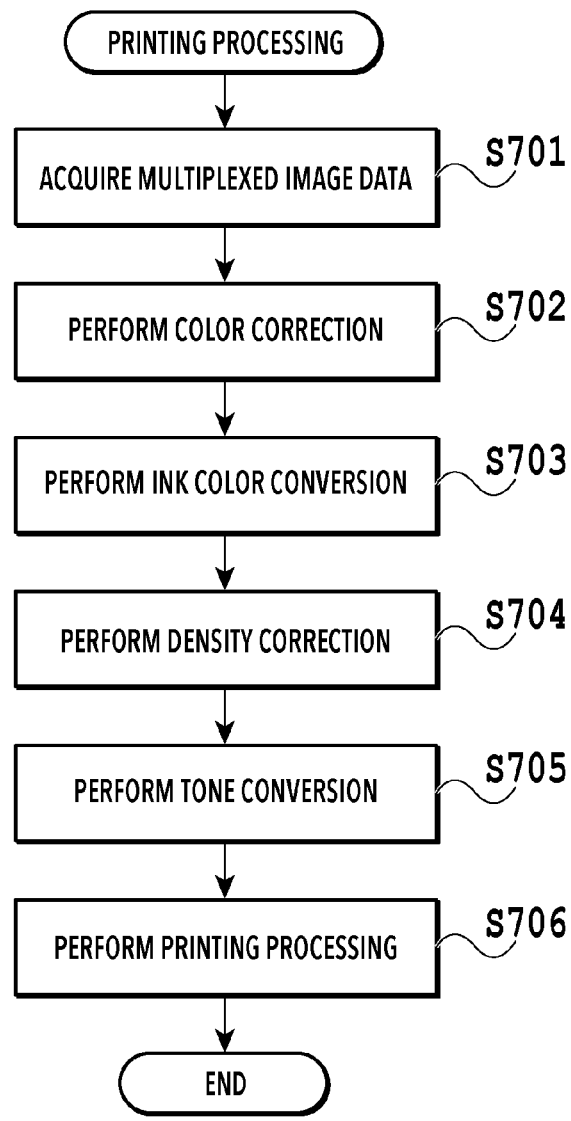
FIG. 7 is a flowchart of printing processing in the first embodiment.

FIG. 7 is a flowchart of printing processing based on image data after multiplexing encoding processing. Explanation is given on the assumption that the processing at each step in FIG. 7 is performed by the CPU of the printing apparatus 109 (in a case of FIG. 1A), but the processing may be performed by the printing unit 111 (in a case of FIG. 1B).

At S701, the CPU of the printing apparatus 109 acquires image data in which multiplexed information is embedded (referred to as multiplexed image data) by the information multiplexing unit 108.

At S702, the CPU of the printing apparatus 109 performs color correction for the multiplexed image data. The "color correction" refers to processing to convert image data so that the color of the image that is printed on a printing medium by the printing apparatus becomes a preferred color. For example, in a case where an image displayed on a display device, such as a monitor, is printed, the color reproduction range in the display device and the color reproduction range in the printing apparatus do not necessarily coincide with each other. There is a case where for a certain color, the reproduction range of the printing apparatus is narrow compared to that of the display device and for another color, the reproduction range of the printing apparatus is wide compared to that of the display device. Because of this, it is necessary to appropriately compress and decompress a color while minimizing the deterioration of the image. In the present embodiment, as an example, the processing is performed in the RGB format. That is, by taking into consideration the reproducibility of the printing apparatus, the input RGB values are converted into RGB values for the printing apparatus (called printing apparatus RGB values). This conversion can be performed by a matrix calculation, but generally, a three-dimensional color correction table is made use of. In a case where it is assumed that each color of the RGB values to be input is represented by eight bits (256 tones), it is not realistic to store all the combinations from the standpoint of the storage capacity, and therefore, as the color correction table, a table in which thinning at predetermined intervals has been performed is used. In the present embodiment, as an example, it is assumed that a table whose number of grid points is 17 is used.

At S703, the CPU of the printing apparatus 109 performs ink color conversion. In the ink color conversion, the printing apparatus RGB values obtained by the color correction at S702 are converted into values of ink colors (for example, CMYK values). For this conversion, a color separation table is used in which a combination of the printing apparatus RB values and a combination of the values of ink colors (for example, CMYK values) are associated with each other in advance. As in the color correction at S702, at this step also, a table whose number of grid points is 17 is used.

At S704, the CPU of the printing apparatus 109 performs density correction. In the ink jet printing apparatus, as the amount of ink increases, which is attached to form dots on a printing medium, such as a sheet, the overlap of dots increases in number, and therefore, the density in the printed image becomes unlikely to rise. At S704, the density is corrected in order to make uniform the responsiveness of the density such as this. By the density correction such as this, it is made easier to secure the creation accuracy of the color correction table and the color separation table. In the printing apparatus that uses the four color inks of CMYK, the density correction is performed for those ink colors. In the present embodiment, as an example, a one-dimensional density correction table is used. As this table, it is sufficient to prepare in advance a table corresponding to the input eight bits (256 tones) of each ink color and in which the input signal value and the corrected output signal value are associated with each other.

At S705, the CPU of the printing apparatus 109 performs tone conversion. The "tone conversion" refers to processing to convert multi-bit data for which density correction has been performed for each ink color at S704 into data of a number of tones that can be printed by the printing apparatus. In the present embodiment, as an example, multi-bit data is converted into (1-bit) data of two tones of printing "1" or non-printing "0". Further, as the tone conversion method, the error diffusion method is adopted which can reproduce visually preferred tones by excluding the low-frequency component of an image. Furthermore, as the input signal (multi-bit data), 8-bit data whose pixel values are 0 to 255 is supposed. By performing the tone conversion at S705 for all the ink colors of C, M, Y, and K, one-bit print data of each ink color that can be printed by the printing apparatus 109 is obtained.

At S706, the CPU of the printing apparatus 109 performs printing processing. To explain in detail, the CPU of the printing apparatus 109 transmits the print data obtained at S705 to the printing engine and attaches ink of each color onto a printing medium based on the transmitted print data. By this step, a printed material is generated in which an image is formed by ink on a printing medium.

In a case where the printed material in which multiplexed information is embedded in the present embodiment is captured by a smartphone having a camera and a display unit, on the display unit of the smartphone, a character string or the like recognized from the multiplexed information embedded in the printed material is displayed as well as the image of the printed material.

Effects of the Present Embodiment

According to the present embodiment, it is possible to embed information while avoiding the object area that is gazed at. Consequently, the image-deteriorated area is no longer gazed at, and therefore, the deterioration of the image quality becomes less conspicuous.

Second Embodiment

In the first embodiment, the area in which multiplexed information is embedded is the entire area except for the object area. In a case where there is one object, this is accepted, but in a case where there is a plurality of objects within an image, on a condition that multiplexed information on each object is embedded in the entire area except for the object area, a plurality of pieces of multiplexed information is embedded in one area as a result. In a case where a plurality of pieces of multiplexed information is embedded in the same area, it is necessary to perform processing to distinguish among the plurality of pieces of multiplexed information at the time of extracting information, and therefore, it is desirable to embed only one piece of information in one area.

Consequently, in the present embodiment, the area in which multiplexed information is embedded is limited to the area around the object area. Due to this, even in a case where there is a plurality of objects, on a condition that each object is sufficiently distant from one another, a plurality of pieces of multiplexed information is no longer embedded in one area. By doing so, it is possible to embed multiplexed information in the portion that is not the object area while preventing a plurality of pieces of multiplexed information from being embedded in one area. In the following, differences from the already-described embodiment are explained mainly and explanation of the same contents as those of the already-described embodiment is omitted appropriately.

As the method of determining whether or not the divided area of interest is around the object area, there are a method that is performed after the loop at S504 is completed and a method that is performed after it is determined that the target object area does not exist within the divided area of interest (after NO at 505).

Figure 8:
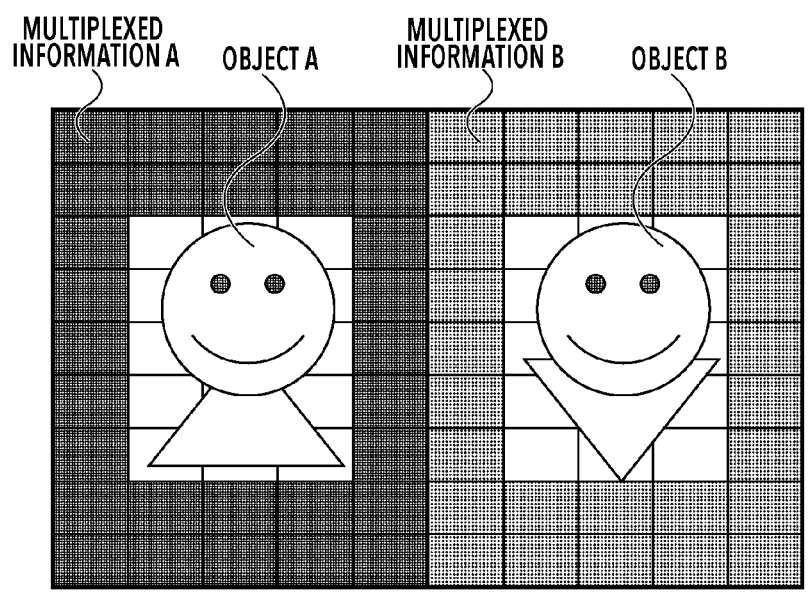
FIG. 8 is a diagram showing layout results in a second embodiment.

In a case where the method is performed after the loop at S504 is completed, processing to lay out multiplexed information on the object whose distance to each divided area is the shortest is performed for each divided area after the loop is completed. As the distance that is found at this time, it may be possible to adopt the Manhattan distance along a route from the overlap area to the "area including object" whose distance to the overlap area is the shortest. Alternatively, it may also be possible to adopt the Euclid distance, which is the distance between the center of the overlap area and the center of the object. FIG. 8 shows the layout results in a case where the Manhattan distance is adopted and multiplexed information on the object whose distance to each divided area is the shortest is selected for each divided area.

Figure 9:
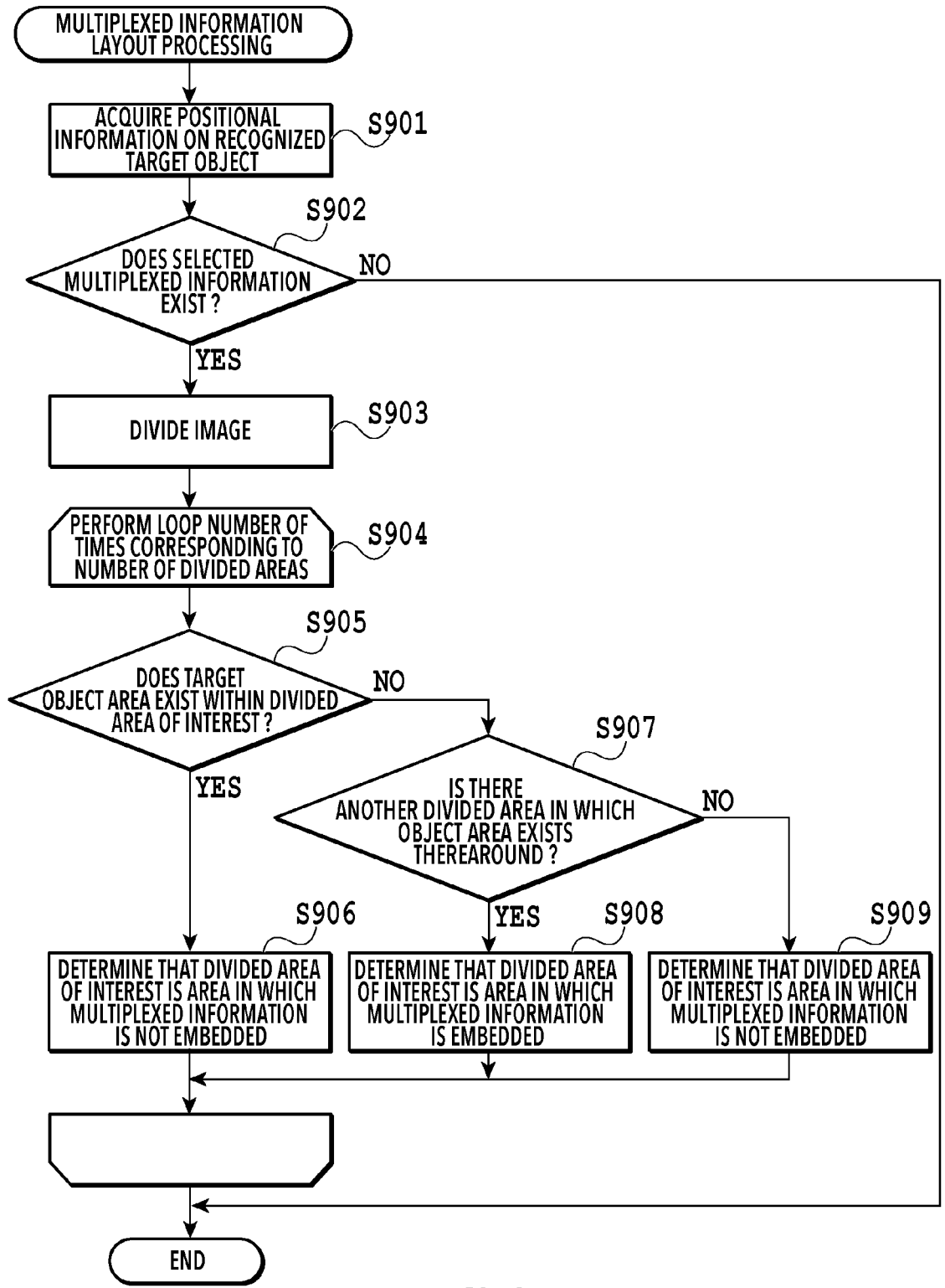
FIG. 9 is a flowchart of multiplexed information layout processing in the second embodiment.

On the other hand, in a case where the method is performed after it is determined that the target object area does not exist within the divided area of interest (after NO at S505), it is necessary to change the flowchart shown in FIG. 5. In the following, multiplexed information layout processing in this case is explained by using FIG. 9. Each step in FIG. 9 is performed by the CPU of the image processing apparatus (in a case of FIG. 1A) or the CPU of the printing apparatus 109 (in a case of FIG. 1B)

At S901, the multiplexed information layout unit 107 acquires the positional information on the target object. This step is the same as S501 in FIG. 5.

At S902, the multiplexed information layout unit 107 determines whether there is multiplexed information selected for the target object. In a case where the determination results at this step are affirmative, the processing advances to S903 and on the other hand, in a case where the determination results are negative, the multiplexed information layout processing is terminated. This step is the same as S502 in FIG. 5.

At S903, the multiplexed information layout unit 107 divides an image. This step is the same as S503 in FIG. 5.

At S904, the multiplexed information layout unit 107 performs loop processing at S905 to S909 the number of times corresponding to the number of divided areas.

At S905, the multiplexed information layout unit 107 determines whether the target object area exists within the divided area of interest by using the positional information on the target object acquired at S901. The multiplexed information layout unit 107 determines that the target object area exists in the divided area of interest not only in a case where the target object area exists across the divided area of interest but also in a case where the target object area exists in a part of the divided area of interest. In a case where the determination results at this step are affirmative, the processing advances to S906 and on the other hand, in a case where the determination results are negative, the processing advances to S907.

At S906, the multiplexed information layout unit 107 determines that the divided area of interest is an area in which multiplexed information is not embedded. In the present embodiment, it is desired to embed multiplexed information while avoiding the object area, and therefore, the divided areas in which the object areas exist are determined to be the areas in which multiplexed information is not embedded at this step.

Figure 10:
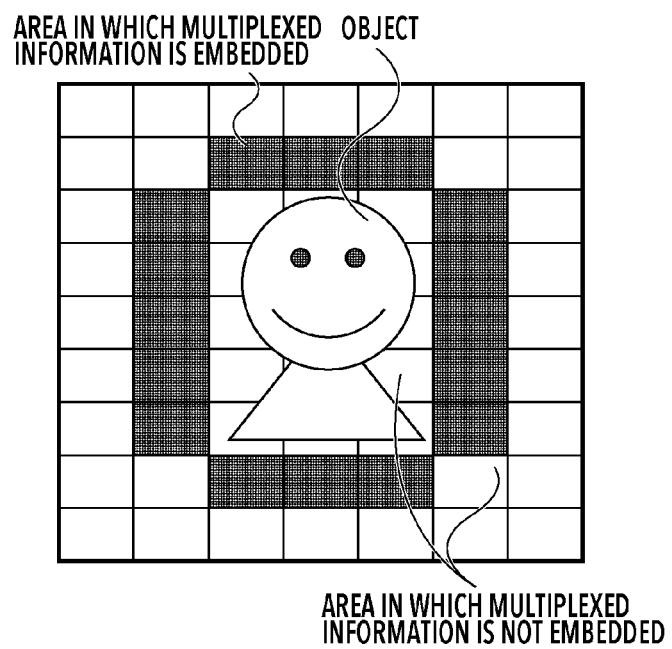
FIG. 10 is a diagram showing layout results in the second embodiment.

At S907, the multiplexed information layout unit 107 determines whether there is another divided area in which the object area exists around the divided area of interest (specifically, within the range including the distance corresponding to the N divided areas from the divided area of interest). In a case where the determination results at this step are affirmative, the processing advances to S908 and on the other hand, in a case where the determination results are negative, the processing advances to S909. FIG. 10 shows the way N is taken to be 1 at S907 and the divided area located around the object and whose distance from another divided area in which the object area exists is a distance corresponding to one area is taken to be an area in which multiplexed information is embedded.

At S908, the multiplexed information layout unit 107 determines that the divided area of interest is the area in which multiplexed information is embedded. As described previously, in the present embodiment, it is desired to embed multiplexed information around the object area while avoiding the object area. Consequently, the divided area in which the object area does not exist and around which another divided area in which the object area exists is determined to be the area in which multiplexed information is embedded at this step.

At S909, the multiplexed information layout unit 107 determines that the divided area of interest is the area in which multiplexed information is not embedded. In the present embodiment, it is desired to embed multiplexed information by limiting the area to the periphery of the object area while avoiding the object area. Consequently, even the divided area in which the object area does not exist, in a case where another divided area in which the object area exists does not exist around the divided object, the divided area is determined to be the area in which multiplexed information is not embedded.

Effects of the Present Embodiment

As described previously, in the present embodiment, the area in which multiplexed information is embedded is limited to the periphery of the object area corresponding to the multiplexed information. Due to this, also in an image in which a plurality of objects exists, it is possible to embed multiplexed information without an overlap between embedding areas.

Third Embodiment

In the second embodiment, the method of embedding multiplexed information around the object area is explained, but with this method, there is a case where embedding areas overlap on a condition that different objects exist close to each other within an image. As a result of that, in a case where a plurality of pieces of multiplexed information is embedded in the same area, processing to distinguish among the plurality of pieces of information becomes necessary at the time of extracting the information. Consequently, there is an issue because it is desirable that only one piece of information be embedded in one area as described previously.

Consequently, in the present embodiment, embedding is performed while preventing an overlap between embedding areas by adjusting the embedding areas so that the areas in which multiplexed information is embedded do not overlap also in a case where objects exists close to each other.

Figure 11A:
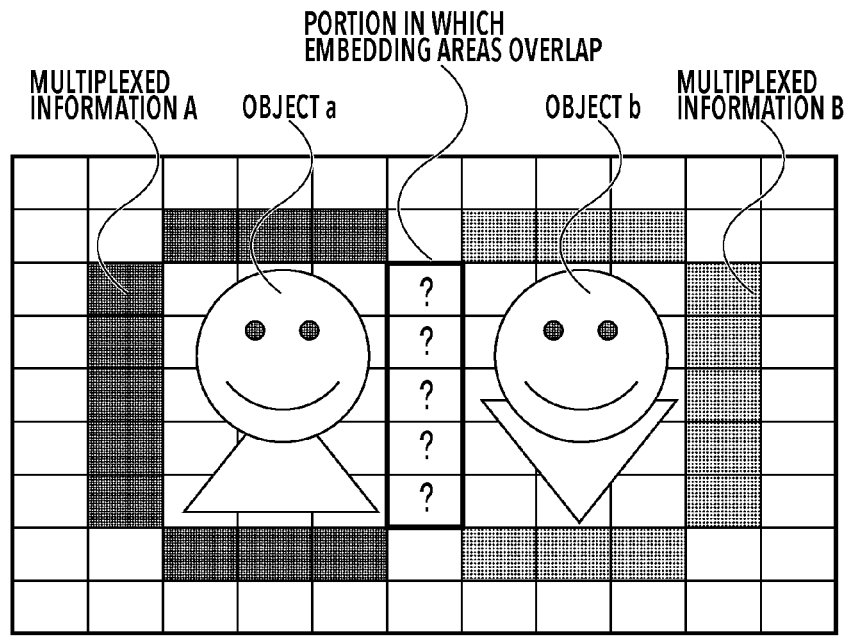
FIG. 11A and FIG. 11B are diagrams for explaining a layout in a third embodiment.

The adjustment of the embedding area is performed, for example, for an image as shown in FIG. 11A. In the image shown in FIG. 11A, two objects, that is, an object a and an object b are captured. Here, a case is explained where the second embodiment is applied to the image in FIG. 11A. In this case, it is necessary to determine to which of the area in which information A, which is information on the object a, is embedded, and the area in which information B, which is information on the object b, is embedded each divided area around the object area corresponds. However, in a case where the method in the second embodiment is used, it is not possible to determine to which of the area in which the information A is embedded and the area in which the information B is embedded part of the divided areas correspond. As shown in FIG. 11A, between the object a and the object b, there are areas indicated by a question mark. These divided areas are the areas for which it is difficult to determine to which of the area in which the information A is embedded and the area in which the information B is embedded they correspond, in other words, the areas at which the area in which the information A is embedded and the area in which the information B is embedded overlap.

<Embedding Area Adjustment Processing>

Figure 12:
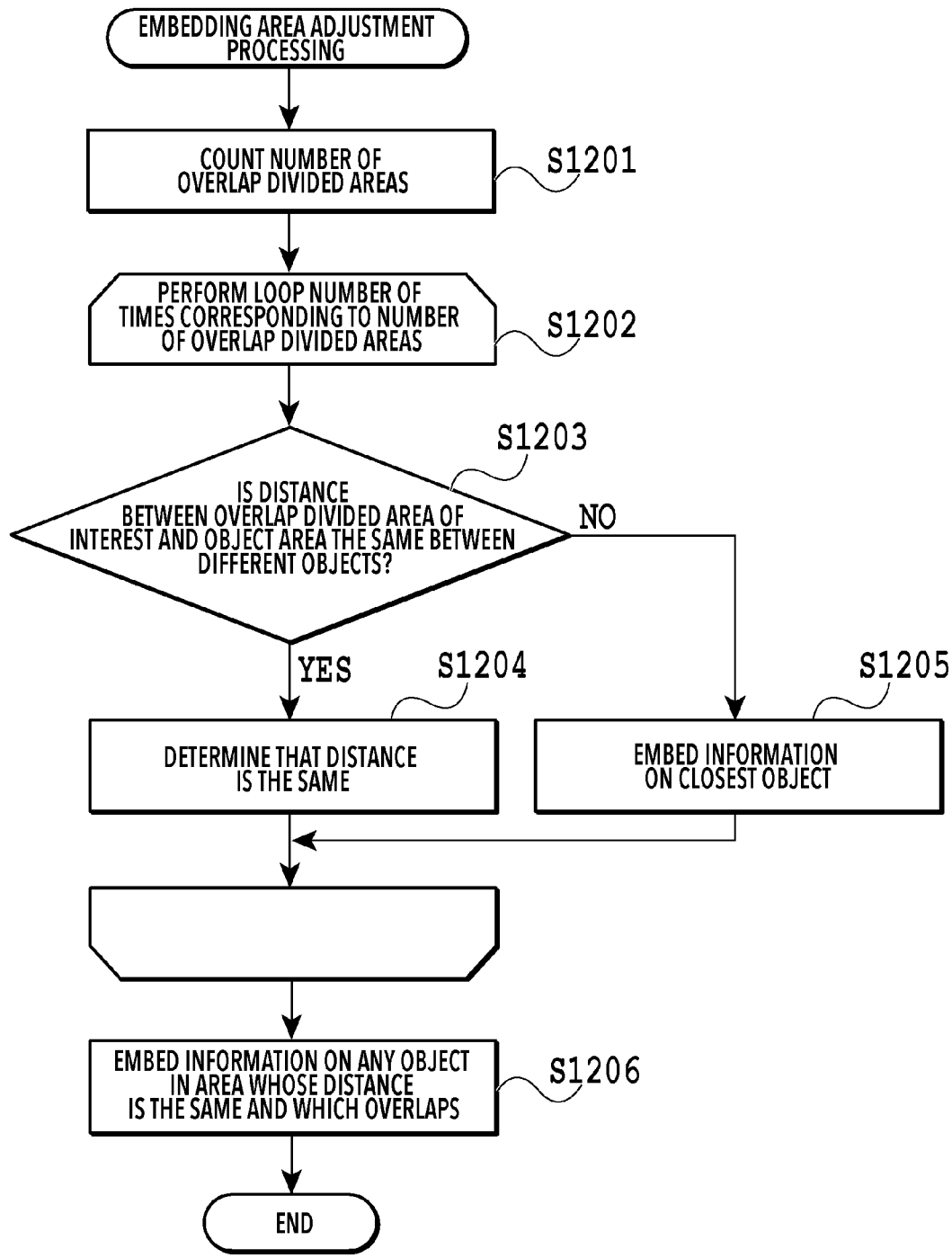
FIG. 12 is a flowchart of embedding area adjustment processing in the third embodiment.

In the following, embedding area adjustment processing in the present embodiment is explained by using FIG. 12. The embedding area adjustment processing shown in FIG. 12 is performed between the multiplexed information layout processing performed by the multiplexed information layout unit 107 and the multiplexing processing performed by the information multiplexing unit 108. Further, the processing at each step in FIG. 12 is performed by the CPU of the image processing apparatus (in a case of FIG. 1A) or the CPU of the printing apparatus 109 (in a case of FIG. 1B).

At S1201, the CPU counts the number of divided areas at which the embedding areas overlap (referred to as overlap divided areas). In other words, the CPU counts the number of divided areas determined to be the position at which a plurality of pieces of multiplexed information is embedded. For example, in a case of FIG. 11, the number of overlap divided areas is five.

At S202, the CPU performs loop processing at S1203 to S1205 the number of times corresponding to the number of overlap divided areas acquired at S1201. For example, in a case of FIG. 11A, the CPU performs the loop processing five times.

At S1203, the CPU determines whether the distance between the overlap divided area of interest and the area of the object (hereinafter, referred to as object area) is the same between the different objects. In a case where the determination results at this step are affirmative, the processing advances to S1204 and on the other hand, in a case where the determination results are negative, the processing advances to S1205.

For example, in a case where the information A on the object a or the information B on the object b is embedded in a certain overlap divided area, whether the distance between the overlap divided area and the area of the object a, and the distance between the overlap divided area and the area of the object b are the same is determined. In a case where it is determined that both distances are the same, the processing advances to S1204 and on the other hand, in a case where it is determined that both distances are not the same, the processing advances to S205.

As the distance that is found at this step, as in the second embodiment, it is possible to adopt the Manhattan distance or the Euclid distance. A case is studied where the distance determination at S1203 is performed by adopting the Manhattan distance in FIG. 1A. In this case, as regards the uppermost divided area with the question mark in FIG. 11A, both the distance between the divided area and the area of the object a, and the distance between the divided area and the area of the object b are 1. Consequently, YES is determined at S1203 and the processing advances to S1204. In FIG. 11A, there are five divided areas indicated by the question mark and the distances between these divided areas and the different objects are all 1, and therefore, the flow advances to S1204 after S1203.

At S1204, the CPU determines that the distance between the overlap divided area of interest and the object area is the same between the different objects. In this case, it is not possible to determine which object information to embed in this divided area based on only the distance between the overlap divided area of interest and the object area. Consequently, at this step, embedding of information is not performed.

At S1205, the CPU embeds multiplexed information corresponding to the object closest to the overlap divided area of interest in the overlap divided area of interest.

At S1206, the CPU embeds multiplexed information corresponding to one of the plurality of objects in each of the overlap divided areas whose distances are determined to be the same at S204. At this time, embedding is performed so that the number of overlap divided areas in which multiplexed information corresponding to one object is the same between the different objects.

The overlap divided area whose distances are determined to be the same at S1204 has the same distance from each of the objects, and therefore, in this overlap divided area, any multiplexed information on a plurality of objects may be embedded. However, it is necessary to select multiplexed information to be embedded in each overlap divided area so that the number of overlap divided areas in which multiplexed information corresponding to one certain object is as equal as possible between the different objects. Specifically, the number of overlap divided areas is divided by the number of objects and multiplexed information corresponding to one arbitrary object is embedded in the overlap divided areas whose number corresponds to the quotient derived by the division. For the overlap divided areas corresponding to the remainder (overlap divided area that is left after division), it is sufficient to allocate multiplexed information randomly so that the multiplexed information on the same object is not selected.

Figure 11B:
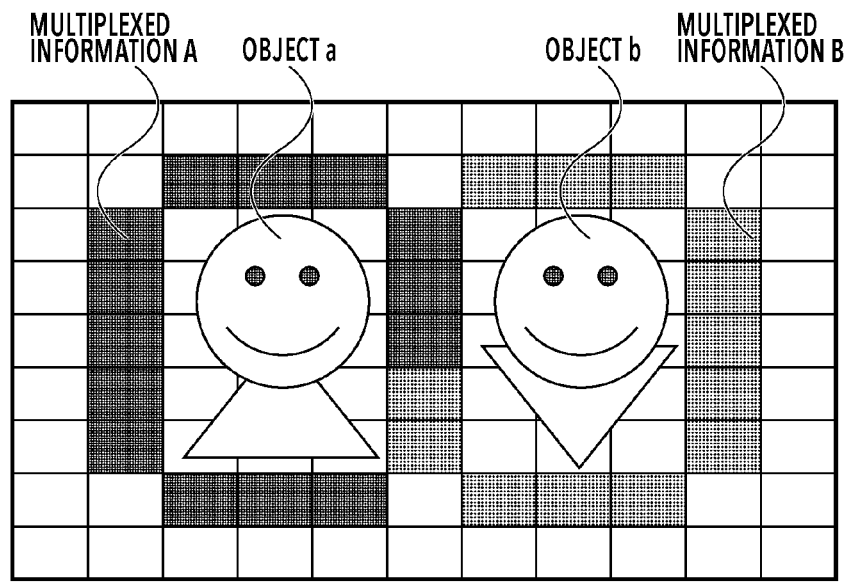

FIG. 11B is a diagram showing a specific example after the areas are allocated. In the example in FIG. 11B, the number of overlap divided areas whose distances are determined to be the same at S1204 is five and the number of objects is two. Consequently, as regards the five areas, the two areas are allocated to the object a, the two areas are allocated to the object b, and the one remaining area is allocated randomly to the object a or the object b. In FIG. 11B, it is assumed that the one remaining area is allocated to the object a.

Effects of the Present Embodiment

As described previously, in the present embodiment, in a case where the areas in which multiplexed information is embedded overlap, the embedding areas are adjusted. Due to this it is possible to perform embedding while preventing an overlap between the embedding areas.

Fourth Embodiment

In the first to third embodiments, the object recognition results and multiplexed information are associated with each other in a one-to-one correspondence manner and multiplexed information is selected by using association information (or not selected). However, as an actual use case, there is a case where a plurality of selection candidates of multiplexed information corresponding to the object recognition results exists. In order to select optimum multiplexed information from a plurality of selection candidates, in the present embodiment, a step of evaluation processing is provided. This evaluation processing is performed by the multiplexed information selection unit 103 in FIG. 1A or FIG. 1B.

FIG. 13A to FIG. 13C are each a diagram for explaining the fourth embodiment, showing a specific example of a DB. FIG. 13A shows a database of training data used for object recognition. FIG. 13B is a database of multiplexed information. FIG. 13A is similar to FIG. 2A and FIG. 13B is similar to FIG. 2C. The present embodiment differs from the embodiments described previously in using a database storing association information as in FIG. 13C.

In FIG. 13C, Multiplexed information No values $B_1$ to $B_8$ are associated with Association No values $S_1$ to $S_9$. Both the Association No values $S_2$ and $S_6$ correspond to the Multiplexed information No value $B_2$. Similarly, Object No values $I_1$ to $I_5$ do not correspond to the Association No values or the Multiplexed information No values in a one-to-one correspondence manner. In the present embodiment, Number of objects, Object size, and Object position are used as conditions for selecting association information. Number of objects, Object size, and Object position are sometimes called information relating to the object other than the information on the kind of object.

Each of the Association No values $S_1$ and $S_4$ corresponds to the same Object No value $I_3$ and in order to uniquely find the Association No value corresponding to a certain object, the Association No values are distinguished from each other based on the position of the object area within the image. In this example, as shown in FIG. 13C, a predetermined threshold value Y_TH is set to Object position and in a case where the Y-coordinate of the object within the image is larger than or equal to the threshold value, the Association No value is taken to be $S_1$ and in the other case, the Association No value is taken to be $S_4$. It is assumed that the origin is located at the top let of the image. As a use case where the embodiment such as this is effective, mention is made of a large-size poster. In a case of a large-size poster whose printed material is large, depending on a reading-side user, the position at which the terminal, such as a smartphone, is held above is different despite that the object is the same. In a case where it is supposed that while an adult holds the terminal above the object at a high position, a child holds the terminal above the object at a low position, it is effective to make the multiplexed information to be embedded in the object different between that for an adult and that for a child. It is possible to use multiplexed information, which is the same character information, in accordance with its purpose, such as that the multiplexed information for an adult includes kanji and hiragana and the multiplexed information for a child includes only hiragana. In a case where it is supposed that the Association No values $S_1$ and $S_4$ in FIG. 13C are used separately between an adult and a child, the Association No value $S_4$ is for an adult and the Association No value $S_1$ is for a child.

Each of the Association No values $S_2$ and $S_9$ corresponds to the same Object No value $I_1$ and in order to uniquely find the Association No value corresponding to a certain object, the Association No values are distinguished from each other based on the size of the object area (Object size) within the image. In this example, as shown in FIG. 13C, a predetermined threshold value SIZE_TH is set to Object size and in a case where Object size in the image is larger than or equal to the threshold value, the Association No value is taken to be $S_2$ and in the other case, the Association No value is taken to be $S_9$. As a use case where the embodiment such as this is effective, mention is made of a case where detailed multiplexed information and simplified multiplexed information on the same object are used separately. To explain specifically, in accordance with whether the same object is described large or described small on a page of a booklet, whether or not the object is described as a main object on the page is known. In a case where the object is described large, the detailed multiplexed information is selected and on the other hand, in a case where the object is described small, the simplified multiplexed information is selected. The simplified multiplexed information has a small amount of data to be embedded, and therefore, it is possible to embed in a small area in the image. In a case where the simplified multiplexed information is selected on a condition that the object is not described as a main object on the page, it is possible to avoid as much as possible the multiplexed information from being embedded overlapping the multiplexed information associated with the object that is described as a main object.

Each of the Association No values $S_7$ and $S_8$ corresponds to the same Object No value $I_5$ and in order to uniquely find the Association No value corresponding to a certain object, the Association No values are distinguished from each other based on Number of objects within the image. In this example, as shown in FIG. 13C, a predetermined threshold value NUM_TH is set to Number of objects and in a case where Number of objects within the image is larger than or equal to the threshold value, the Association No value is taken to be $S_7$ and in the other case, the Association No value is taken to be $S_8$. As a use case where the embodiment such as this is effective, mention is made of a case where multiplexed information for group information and multiplexed information for individual information are used separately. For example, in a case where a plurality of garments is recognized in the neighborhood as a result of recognizing the objects, group information, such as introduction of the bland of the garments, is embedded as multiplexed information. On the other hand, in a case where one garment is recognized, individual information, such as the product name and the price of the garment, is embedded as multiplexed information.

It may also be possible to prepare association information whose Object No value is blank like the Association No value $S_5$. In this case, the Multiplexed information No value $B_5$ is selected on a condition that Object size of an arbitrary object satisfies a predetermined condition (Size≥SIZE_TH) irrespective of the kind of object.

In a case where FIG. 13C is used, there is a possibility that one object coincides with the conditions for selecting a plurality of pieces of association information. For example, it is assumed that there is an object within the image, which corresponds to Object No "$I_1$" and whose size is larger than or equal to TH. This object corresponds to the Association No values "$S_2$" and "$S_5$". In order to select multiplexed information from a plurality of association conditions in the case such as this, it is effective to provide a step of evaluation processing. As the evaluation method, in addition to the method of performing selective determination based on the condition for selecting association information as described above, there is a method of evaluating the degree of relation by calculating the total sum of weights. The weights of Object No, Number of objects. Object size, and Object position are set as $\alpha_1$, $\alpha_2$, $\alpha_3$, and $\alpha_4$, respectively. As expressed in formula (5), in a case where each condition is met, an evaluation value is calculated by performing cumulative addition of the weights. The Association No value whose final evaluation value is the highest is selected and the Multiplexed information No value at that time is output.

$S_L$ indicates each value of Association No. T is a variable indicating 1 in a case where each of the conditions of Object No, Number of objects, Object size, and Object position given to Association No is met and −1 in a case where the condition is not met. It is assumed that in a case where the condition given to Association No is blank, such as "-" in FIG. 13C. T is taken to be 0 (T=0). The value of Multiplexed information No associated with that whose value of SUM is large is taken as the final selection results.

For example, both the Association No values $S_2$ and $S_5$ have the same Object size condition, but while the Association No value $S_2$ specifies the Object No value $I_1$, the Association No value $S_5$ does not specify anything. In a case where nothing is specified, T is zero (T=0), and therefore, the evaluation value is reduced accordingly. In a case where it is assumed that all the weights are the same value and the Object No value of the recognized object is $I_1$ and Object size satisfies Size≥SIZE_TH, as evaluation results, the Multiplexed information No value $B_2$ is selected for the target object. However, in a case where the Object No value of the recognized object is not $I_1$, the Multiplexed information No value $B_5$ is selected for the target object.

It is also possible to set a threshold value to SUM. In that case, on a condition that SUM corresponding to all the Association No values does not exceed a threshold value, a value indicating "non-selection" is output as selection results. The layout processing for a target object that is determined to be "non-selection" is the same as that of the first embodiment.

Figure 14:
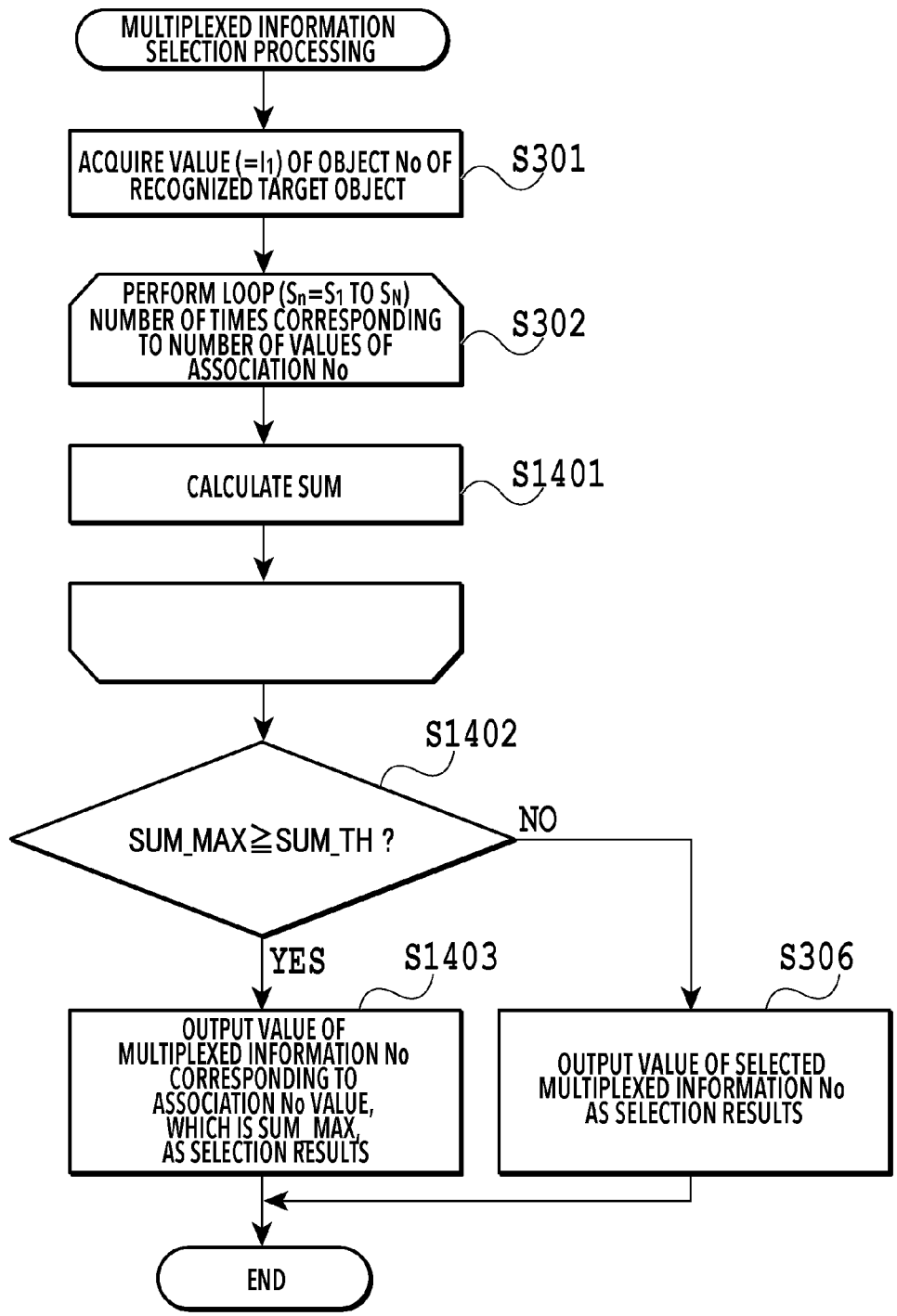
FIG. 14 is a flowchart of information selection processing in the fourth embodiment.

FIG. 14 is a flowchart of information selection processing in the present embodiment. Explanation of each step in FIG. 14, which is the same as the step in the first embodiment, is omitted (see FIG. 3).

At S1401, the multiplexed information selection unit 103 calculates an evaluation value SUM corresponding to the Association No value of interest.

At S1402, the multiplexed information selection unit 103 sets the largest value of the evaluation values SUM corresponding to all the Association No values as SUM_MAX. Then, the multiplexed information selection unit 103 determines whether SUM_MAX is larger than or equal to a predetermined threshold value SUM_TH. In a case where the determination results at this step are affirmative, the processing advances to S1403 and on the other hand, in a case where the determination results are negative, the processing advances to S306.

At S1403, the multiplexed information selection unit 103 outputs the Multiplexed information No value corresponding to the Association No value, which is SUM_MAX, and the CPU of the image processing apparatus acquires the output value.

Effects of the Present Embodiment

As described previously, in the present embodiment, in order to associate object information relating to a variety of use cases and multiplexed information with each other, multiplexed information is selected by using a plurality of evaluation items and evaluation steps. Due to this, multiplexed information is selected automatically for a variety of use cases, and therefore, the load of a user is reduced.

Fifth Embodiment

In the first embodiment and the fourth embodiment described previously, Object No and the like are used as

[Mathematical formula 5]
$$SUM_{S_L} = \sum_{o=1}^{4} T_o \times \alpha_o$$

association information. Normally, association information is set manually, but it is also possible to set association information automatically.

For example, it is supposed that training data to be stored in the object DB 102 is acquired from a moving image. It is possible to extract a certain frame within a moving image and perform object recognition for the extracted frame. On the other hand, in a moving image, a voice is included, and therefore, it is possible to set a voice during several seconds before and after the frame as multiplexed information. In a case where object recognition is performed for a person captured in a frame, it is possible to associate the "person" information and the "voice" information at that time with each other. For information including the information indicating the kind of an object captured in an image and multiplexing-target information in a set as described above, it is possible to generate association information automatically. Information that can be multiplexed (voice in the present embodiment) is sometimes called information corresponding to additional information.

As another example, there is SNS information. In SNS, a photo and a comment are described at the same time. In a case where it is desired to embed a comment as multiplexed information, it is possible to associate with each other the information on the "person" captured in the photo and the contents of the "comment" at that time.

Effects of the Present Embodiment

According to the present embodiment, it is possible to automatically set association information, and therefore, it is possible to reduce the load of a user compared to a case where setting is performed manually.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to one embodiment of the present disclosure, in a case where information is embedded in an image, it is possible to reduce image quality deterioration of an object area that is gazed at by a user.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-222015, filed Dec. 9, 2019, which is hereby incorporated by reference wherein in its entirety.

What is claimed is:

1. An image processing apparatus comprising:
a memory storing instructions; and
at least one processor executing the instructions cause the image processing apparatus to act as:
a recognition unit configured to recognize an object within an image; and
a layout unit configured to lay out information relating to an object recognized by the recognition unit in an area except for an object area for the recognized object within the image,
wherein the layout unit has a first determination unit configured to determine whether the object area exists inside each divided area obtained by dividing the image.

2. The image processing apparatus according to claim 1, wherein
the layout unit determines that a divided area inside which the object area does not exist is an area in which information is embedded and a divided area inside which the object area exits is an area in which information is not embedded.

3. The image processing apparatus according to claim 1, wherein
the layout unit layouts information relating to an object recognized by the recognition unit in an area except for an object area for the recognized object and which is around the object area within the image.

4. The image processing apparatus according to claim 3, wherein
the layout unit further comprises:
a first determination unit configured to determine whether the object area exists inside each divided area obtained by dividing the image; and
a second determination unit configured to determine where there exists another divided area in which the object area exists around a divided area for which it is determined that the object area does not exist inside by the first determination unit.

5. The image processing apparatus according to claim 4, wherein
the layout unit determines that:
a divided area inside which the object area exists is an area in which information is not embedded;
a divided area inside which the object area does not exist and there exits another divided area in which the object area exists therearound is an area in which information is embedded; and
a divided area inside which the object area does not exist and there exists not another divided area in which the object area exists therearound is an area in which information is not embedded.

6. The image processing apparatus according to claim 1, wherein the at least one processor executing the instructions cause the image processing apparatus to further act as:

an adjustment unit configured to adjust embedding areas so that a plurality of pieces of information corresponding to a plurality of different objects is not embedded in an overlapping manner in one divided area.

7. The image processing apparatus according to claim 1, further comprising:
a storage unit configured to store information relating to an object; and
the at least one processor executing the instructions cause the image processing apparatus to further act as a determination unit configured to selectively determine information relating to an object recognized by the recognition unit from among information stored in the storage unit.

8. The image processing apparatus according to claim 7, wherein
in the storage unit, as information relating to an object, embedding-target additional information and association information for associating object recognition results are stored.

9. The image processing apparatus according to claim 8, the at least one processor executing the instructions cause the image processing apparatus to further act as:
a generation unit configured to generate the association information automatically.

10. An image processing method comprising:
recognizing an object within an image;
laying out information relating to a recognized object in an area except for an object area for the recognized object within the image; and
determining whether the object area exists inside each divided area obtained by dividing the image.

11. The image processing method according to claim 10, wherein
a divided area inside which the object area does not exist is determined to be an area in which information is embedded and a divided area inside which the object area exits is determined to be an area in which information is not embedded.

12. The image processing method according to claim 10, wherein
information relating to the recognized object is laid out in an area except for an object area for the recognized object and which is around the object area within the image.

13. The image processing method according to claim 12, further comprising:
determining whether the object area exists inside each divided area obtained by dividing the image; and
determining whether there exists another divided area in which the object area exists around a divided area for which it is determined that the object area does not exist inside.

14. The image processing method according to claim 13, wherein
a divided area inside which the object area exists is determined to be an area in which information is not embedded;
a divided area inside which the object area does not exist and there exits another divided area in which the object area exists therearound is determined to be an area in which information is embedded; and
a divided area inside which the object area does not exist and there exists not another divided area in which the object area exists therearound is determined to be an area in which information is not embedded.

15. The image processing method according to claim 10, further comprising:
adjusting embedding areas so that a plurality of pieces of information corresponding to a plurality of different objects is not embedded in an overlapping manner in one divided area.

16. The image processing method according to claim 10, further comprising:
storing information relating to an object; and
selectively determining information relating to the recognized object from among the stored information.

17. The image processing method according to claim 16, wherein
as the information relating to an object, embedding-target additional information and association information for associating object recognition results are stored.

18. A non-transitory computer readable storage medium storing a program for causing a computer to perform an image processing method comprising:
recognizing an object within an image;
laying out information relating to a recognized object in an area except for an object area for the recognized object within the image; and
determining whether the object area exists inside each divided area obtained by dividing the image.

* * * * *